(12) United States Patent
Aebker et al.

(10) Patent No.: US 8,196,990 B2
(45) Date of Patent: Jun. 12, 2012

(54) VEHICULAR SEAT ASSEMBLY AND VEHICLES INCLUDING SAME

(75) Inventors: Paul T. Aebker, Dublin, OH (US);
Donald W. Jackson, West Mansfield, OH (US); Hiroaki Taniguchi, Dublin, OH (US); Travis Newberg, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 79 days.

(21) Appl. No.: 12/755,552

(22) Filed: Apr. 7, 2010

(65) Prior Publication Data
US 2011/0248523 A1    Oct. 13, 2011

(51) Int. Cl.
*B60N 2/32* (2006.01)
(52) U.S. Cl. ............................................. 296/69
(58) Field of Classification Search ............ 296/69, 296/182.1, 26.1, 37.15, 37.16, 63, 65.05, 296/65.09, 65.16, 66; 224/275
See application file for complete search history.

(56) References Cited

U.S. PATENT DOCUMENTS

| | | | |
|---|---|---|---|
| 4,503,870 A | | 3/1985 | Peterson |
| 4,637,648 A | | 1/1987 | Okino et al. |
| 4,779,917 A | * | 10/1988 | Campbell et al. ........... 296/65.09 |
| 4,784,268 A | | 11/1988 | Perchak |
| 4,848,826 A | * | 7/1989 | Kuwabara et al. .......... 296/97.23 |
| 4,869,541 A | * | 9/1989 | Wainwright ................ 296/65.09 |
| 4,932,709 A | * | 6/1990 | Wainwright ................ 296/65.09 |
| 4,943,105 A | * | 7/1990 | Kacar et al. ................. 296/24.31 |
| 4,979,772 A | * | 12/1990 | Carey et al. .................. 296/39.1 |
| 5,039,155 A | * | 8/1991 | Suman et al. ............... 296/65.03 |
| 5,195,795 A | * | 3/1993 | Cannera et al. ............. 296/65.09 |
| 5,249,724 A | * | 10/1993 | Green .......................... 224/275 |
| 5,322,335 A | * | 6/1994 | Niemi ......................... 296/97.23 |
| 5,441,183 A | * | 8/1995 | Frenzel ........................ 224/542 |
| 5,487,361 A | | 1/1996 | Dean |
| 5,582,453 A | | 12/1996 | Leuchtmann et al. |
| 5,664,822 A | * | 9/1997 | Rosenfield .................... 296/39.2 |
| 5,716,091 A | * | 2/1998 | Wieczorek .................. 296/37.16 |
| 5,830,560 A | * | 11/1998 | Koa ............................... 428/192 |
| 5,839,773 A | * | 11/1998 | Ban et al. .................... 296/65.09 |
| 5,979,962 A | * | 11/1999 | Valentin et al. .............. 296/37.1 |
| 5,979,964 A | * | 11/1999 | Ban et al. .......................... 296/66 |
| 6,076,880 A | * | 6/2000 | Coffer et al. ................ 296/65.09 |
| 6,089,641 A | | 7/2000 | Mattarella et al. |
| 6,234,429 B1 | | 5/2001 | Yang |
| 6,290,277 B1 | * | 9/2001 | Spykerman et al. ........ 296/24.43 |
| 6,296,291 B1 | | 10/2001 | Lansinger |
| 6,402,250 B1 | | 6/2002 | Lange |
| 6,406,085 B1 | * | 6/2002 | Stanesic ...................... 296/97.23 |
| 6,416,104 B1 | * | 7/2002 | Fisher et al. ................ 296/37.16 |
| 6,478,355 B1 | * | 11/2002 | Van Eden et al. ............ 296/37.6 |

(Continued)

*Primary Examiner* — Kiran B Patel
(74) *Attorney, Agent, or Firm* — Ulmer & Berne LLP (57) ABSTRACT

A vehicle includes a body structure and a rear vehicular seat assembly that includes a seat back and a cover panel. The seat back is movably coupled with the body structure and is movable between upright and cargo support positions. The cover panel is associated with the seat back and includes a flap, a base portion, and a perforated living hinge. The base portion is fixedly coupled with the body structure. The perforated living hinge includes a plurality of arms. Each arm of the plurality of arms extends between the flap and the base portion to facilitate pivoting of the flap with respect to the base portion about a hinge axis between stowed and bridging positions. The plurality of arms are spaced from each other and cooperate to at least partially define a plurality of perforations. At least one of the perforations is intersected by the hinge axis.

9 Claims, 9 Drawing Sheets

U.S. PATENT DOCUMENTS

| | | | |
|---|---|---|---|
| 6,644,709 B2 * | 11/2003 | Inagaki et al. | 296/37.16 |
| 6,648,395 B2 | 11/2003 | Hoshino | |
| 6,685,269 B1 * | 2/2004 | Freijy et al. | 297/332 |
| 6,698,829 B1 * | 3/2004 | Freijy et al. | 297/188.09 |
| 6,817,660 B2 | 11/2004 | Ito et al. | |
| 6,874,840 B2 | 4/2005 | Neale | |
| 6,918,625 B2 | 7/2005 | Storto et al. | |
| 6,929,301 B2 | 8/2005 | Kim et al. | |
| 7,036,884 B2 | 5/2006 | Becker et al. | |
| 7,077,463 B2 * | 7/2006 | Sun et al. | 297/15 |
| 7,216,916 B2 * | 5/2007 | Czerwinski et al. | 296/66 |
| 7,240,956 B2 | 7/2007 | DeWolfe et al. | |
| 7,261,375 B2 * | 8/2007 | Godshaw et al. | 297/228.12 |
| 7,322,629 B2 * | 1/2008 | McClintock | 296/37.14 |
| 7,422,047 B1 * | 9/2008 | McDonald | 160/229.1 |
| 7,488,024 B1 * | 2/2009 | Medlar | 296/37.14 |
| 7,699,398 B2 * | 4/2010 | Sokolla et al. | 297/377 |
| 7,730,586 B2 * | 6/2010 | McDonald | 16/326 |
| 7,794,004 B2 * | 9/2010 | Aebker et al. | 296/37.8 |
| 7,806,453 B2 * | 10/2010 | Aebker | 296/37.16 |
| 7,914,074 B2 * | 3/2011 | Lindsay | 297/188.13 |
| 8,002,325 B2 * | 8/2011 | Foussianes et al. | 296/68.1 |
| 2002/0135215 A1 | 9/2002 | Magyar et al. | |
| 2002/0145022 A1 * | 10/2002 | Nguyen et al. | 224/539 |
| 2003/0090120 A1 * | 5/2003 | Barber et al. | 296/37.5 |
| 2004/0134946 A1 * | 7/2004 | Gammon | 224/275 |
| 2006/0170235 A1 * | 8/2006 | Oilar et al. | 296/37.14 |
| 2008/0143163 A1 | 6/2008 | Harth | |
| 2008/0185866 A1 * | 8/2008 | Tarrant et al. | 296/97.22 |
| 2010/0327635 A1 * | 12/2010 | Whalen et al. | 297/129 |
| 2011/0101721 A1 * | 5/2011 | Sogame et al. | 296/37.1 |
| 2011/0101736 A1 * | 5/2011 | Sogame | 296/203.04 |

* cited by examiner

VEHICULAR SEAT ASSEMBLY AND VEHICLES INCLUDING SAME

TECHNICAL FIELD

Vehicles are provided which include a seat assembly. The seat assembly includes a cover panel having a perforated living hinge.

BACKGROUND

Some conventional vehicles include rear seats that can be folded forward to enlarge the vehicle's rear cargo area. When the rear seats are folded forward, a gap is exposed between the rear seats and a rear cargo surface. This gap affects the ease of loading and unloading of cargo into the rear cargo area. For example, the loading of cargo into the rear cargo area is oftentimes easily achieved by sliding the cargo along the cargo surface. However, if the cargo needs to be slid from the cargo surface and onto the folded rear seat, the cargo can become obstructed by the gap. Also, smaller cargo provided into the rear cargo area can fall into the gap and become hidden from plain view, and can be damaged by the rear seat when unfolded. In some conventional vehicles, a cover panel (e.g., a flipper panel) is accordingly provided that covers this gap when the rear seat is folded forward.

SUMMARY

In accordance with one embodiment, a vehicle comprises a body structure, a first seat support member, a second seat support member, and a rear vehicular seat assembly. The first and second seat support members are attached to the body structure. The rear vehicular seat assembly comprises a seat back and a cover panel. The seat back is movably coupled with each of the first seat support member and the second seat support member and is movable between an upright position and a cargo support position. The cover panel is associated with the seat back and comprises a flap, a base portion, and a perforated living hinge. The base portion is fixedly coupled with the body structure. The perforated living hinge comprises a plurality of arms. Each arm of the plurality of arms extends between the flap and the base portion to facilitate pivoting of the flap with respect to the base portion about a hinge axis between a stowed position and a bridging position. The plurality of arms are spaced from each other and cooperate to at least partially define a plurality of perforations. At least one of the perforations is intersected by the hinge axis.

In accordance with yet another embodiment, a vehicle comprises a body structure, a left seat support member, a right seat support member, a center seat support member, a support member, and a vehicular seat assembly. Each of the left seat support member, the right seat support member, and the center seat support member are attached to the body structure. The support member is coupled with the left and right seat support members. The vehicular seat assembly comprises a left seat back, a right seat back, and a cover panel. The left seat back is movably coupled with each of the left seat support member and the center seat support member and is movable between an upright position and a cargo support position. The right seat back is movably coupled with each of the right seat support member and the center seat support member and is movable between an upright position and a cargo support position. The cover panel comprises a base portion, a left flap, a left perforated living hinge, a right flap, and a right perforated living hinge. The base portion is coupled with the support member. The left perforated living hinge comprises a plurality of left arms. Each left arm of the plurality of left arms extends between the left flap and the base portion to facilitate pivoting of the left flap about a hinge axis between a stowed position and a bridging position. The right perforated living hinge comprises a plurality of right arms. Each right arm of the plurality of right arms extends between the right flap and the base portion to facilitate pivoting of the right flap about the hinge axis between a stowed position and a bridging position. The plurality of left arms are spaced from each other and at least partially define a plurality of left perforations. At least one of the left perforations is intersected by the hinge axis. The plurality of right arms are spaced from each other and at least partially define a plurality of right perforations. At least one of the right perforations is intersected by the hinge axis.

In accordance with yet another embodiment, a cover panel comprises a base portion, a flap, and a perforated living hinge. The base portion is configured for coupling to a vehicular body structure. The perforated living hinge comprises a plurality of arms. Each arm of the plurality of arms extends between the flap and the base portion to facilitate pivoting of the flap about a hinge axis between a stowed position and a bridging position. The plurality of arms is spaced from each other and cooperates to at least partially define a plurality of perforations.

BRIEF DESCRIPTION OF THE DRAWINGS

Various embodiments will become better understood with regard to the following description, appended claims, and accompanying drawings wherein:

DETAILED DESCRIPTION

Figure 1:
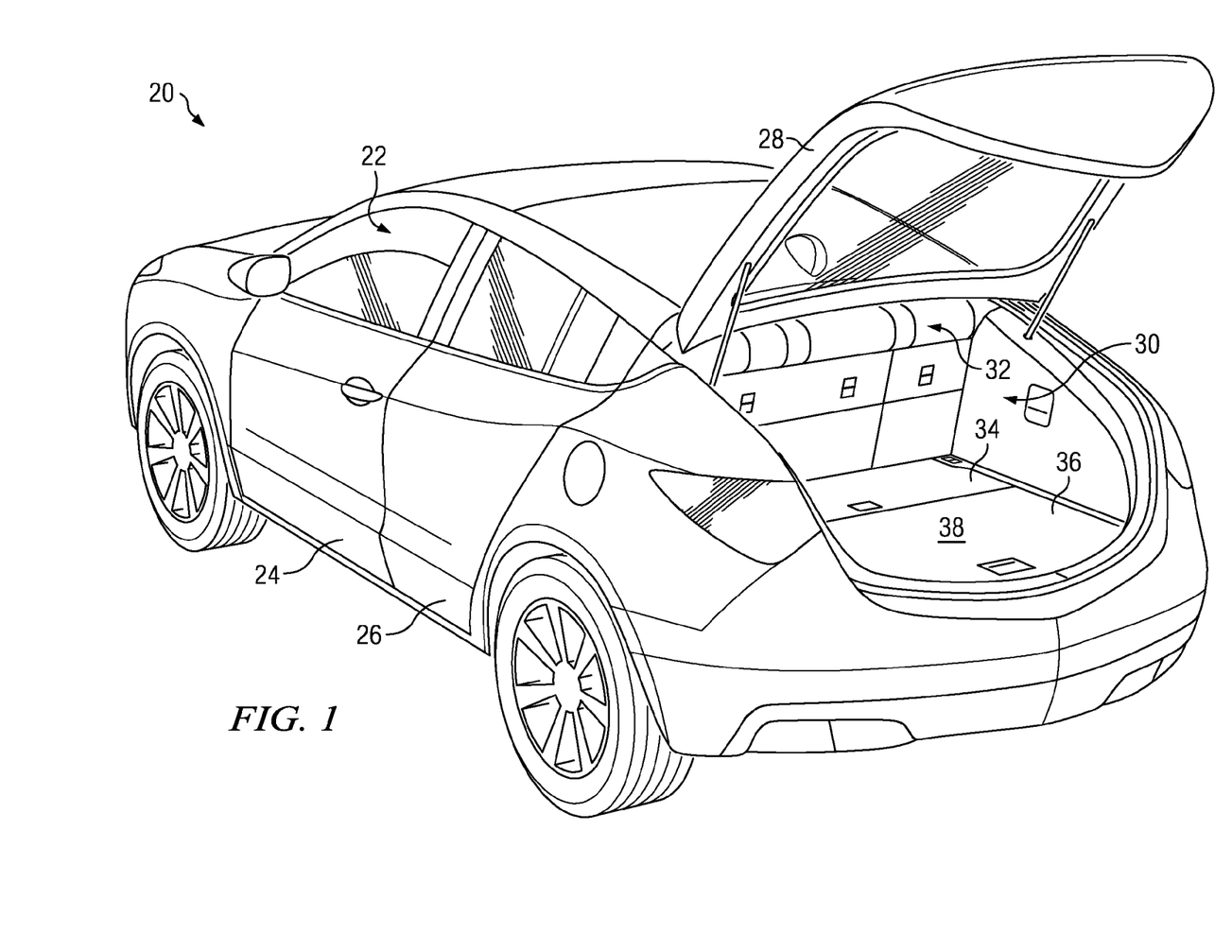
FIG. 1 is a rear perspective view depicting a vehicle in accordance with one embodiment, wherein a rear door is opened to reveal a cargo area.

In connection with the views and examples of FIGS. 1-10, wherein like numbers indicate the same or corresponding elements throughout the views, FIG. 1 illustrates a vehicle 20. The vehicle 20 is shown in FIG. 1 to comprise a cross-over type vehicle ("CUV"). However, a vehicle in accordance with alternative embodiments can comprise a sport-utility vehicle ("SUV"), a truck, a van, a recreational vehicle, an all terrain vehicle, or a utility vehicle, for example. As illustrated in FIG. 1, the vehicle 20 can include a passenger compartment 22. The vehicle 20 can include a pair of front doors (e.g., 24) and a pair of back doors (e.g., 26) that facilitate ingress/egress of passengers into/from the passenger compartment 22. The vehicle 20 can also include a rear door 28 that can be selectively opened to reveal a cargo area 30.

The vehicle 20 can include a pair of front seats (not shown) and a rear seating assembly 32. A front and rear cargo lid 34, 36 can be provided behind the rear seating assembly 32. Each of the front and rear cargo lids 34, 36 can be selectively opened to reveal respective underlying storage compartments. The front and rear cargo lids 34, 36 can cooperate to define a cargo support surface 38 behind the rear seating assembly 32 that facilitates support of cargo within the cargo area 30.

Figure 2:
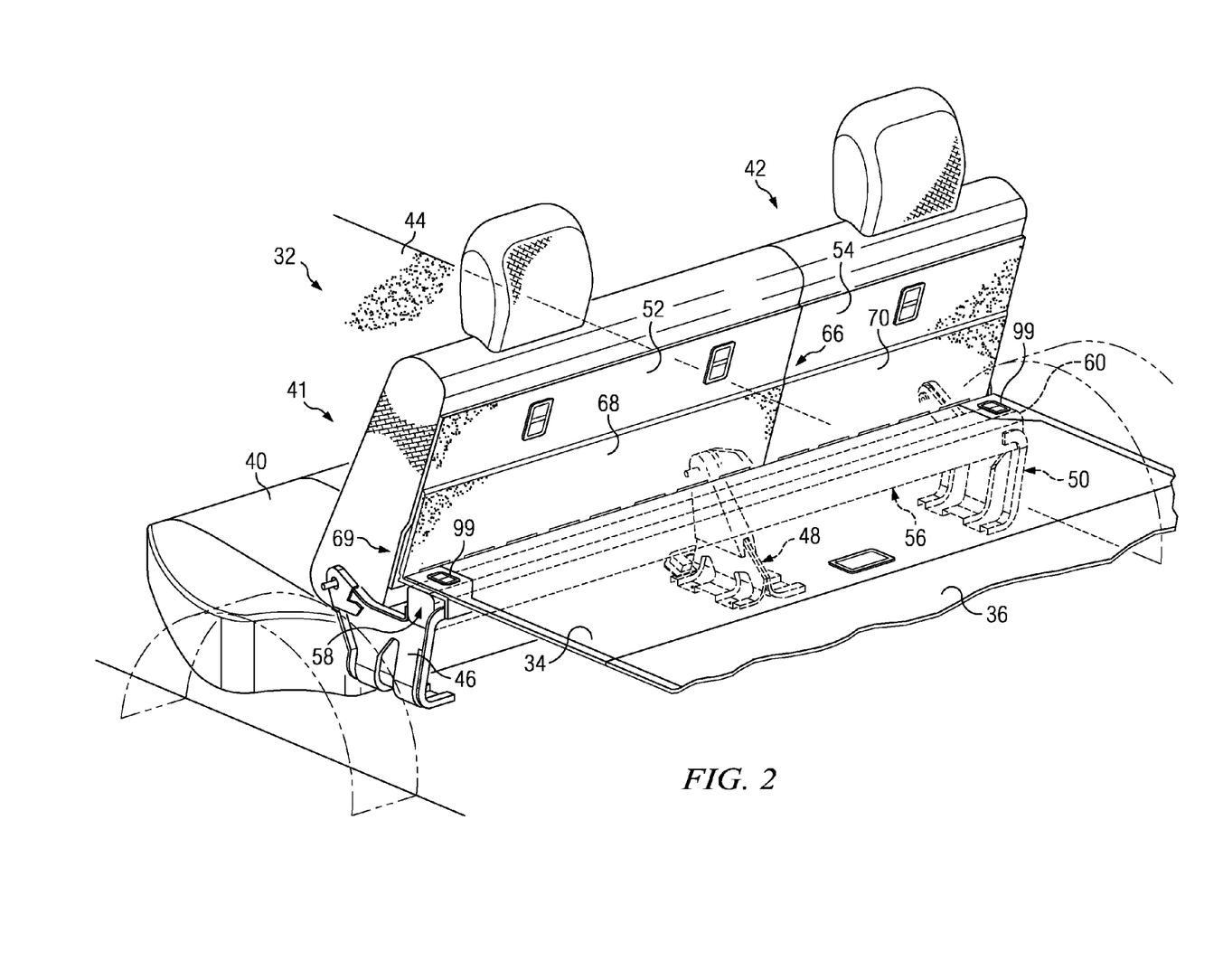
FIG. 2 is a left rear perspective view depicting a rear seat assembly and other various vehicular components within the passenger compartment of the vehicle of FIG. 1, wherein left and right seat backs are in upright positions, left and right flaps of a cover panel are in stowed positions, and a front cargo lid is in a closed position.

As illustrated in FIG. 2, the rear seating assembly 32 can include a seat bottom 40, a left seat back 41, and a right seat back 42. A body structure 44 of the vehicle 20 can provide underlying support for the seat bottom 40. The body structure 44 can comprise one or more frame members, body members, and/or other components which generally form a shell of the vehicle 20. In one embodiment, the seat bottom 40 can be coupled to the body structure 44 with releasable latches (not shown). A left seat support member 46, a center seat support member 48, and a right seat support member 50 can be attached to the body structure 44 (e.g., with bolts) and spaced apart from one another. The left seat back 41 can be movably supported by the left seat support member 46 and the center seat support member 48. The right seat back 42 can be movably supported by the center seat support member 48 and the right seat support member 50.

It will be appreciated that a seat back can be movably coupled with a body structure through any of a variety of suitable alternative seat support member arrangements. For example, a body structure can include a pair of sidewalls (not shown) that are adjacent to the rear seating assembly 32. A left seat back can be pivotally supported by one of the sidewalls and a center seat support member (e.g., 48). A right seat back can be pivotally supported between the other of the sidewalls and the center seat support member (e.g., 48). It will also be appreciated that left and right seat backs can be provided in any of a variety of suitable alternative arrangements such as coupled together in a unitary seat back configuration, for example. In still another alternative embodiment, seat backs can be movably coupled with and supported by a seat bottom. It will further be appreciated that movable coupling of left and right seat backs can involve pivoting, sliding, articulation, or otherwise.

Figure 3:
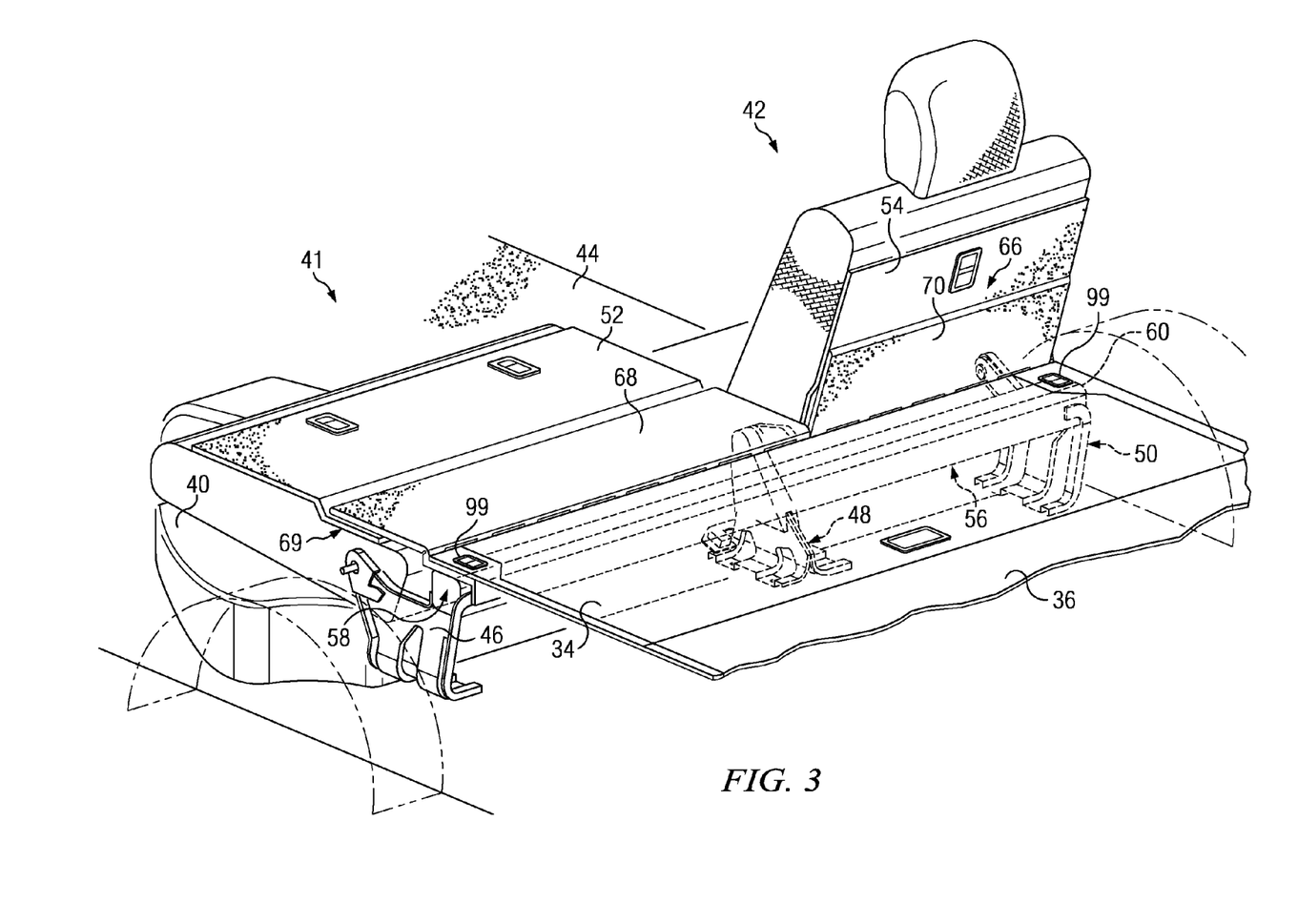
FIG. 3 is a left rear perspective view depicting the components of FIG. 2, but wherein the left seat back is in a cargo support position and the left flap is in a bridging position.
Figure 4:
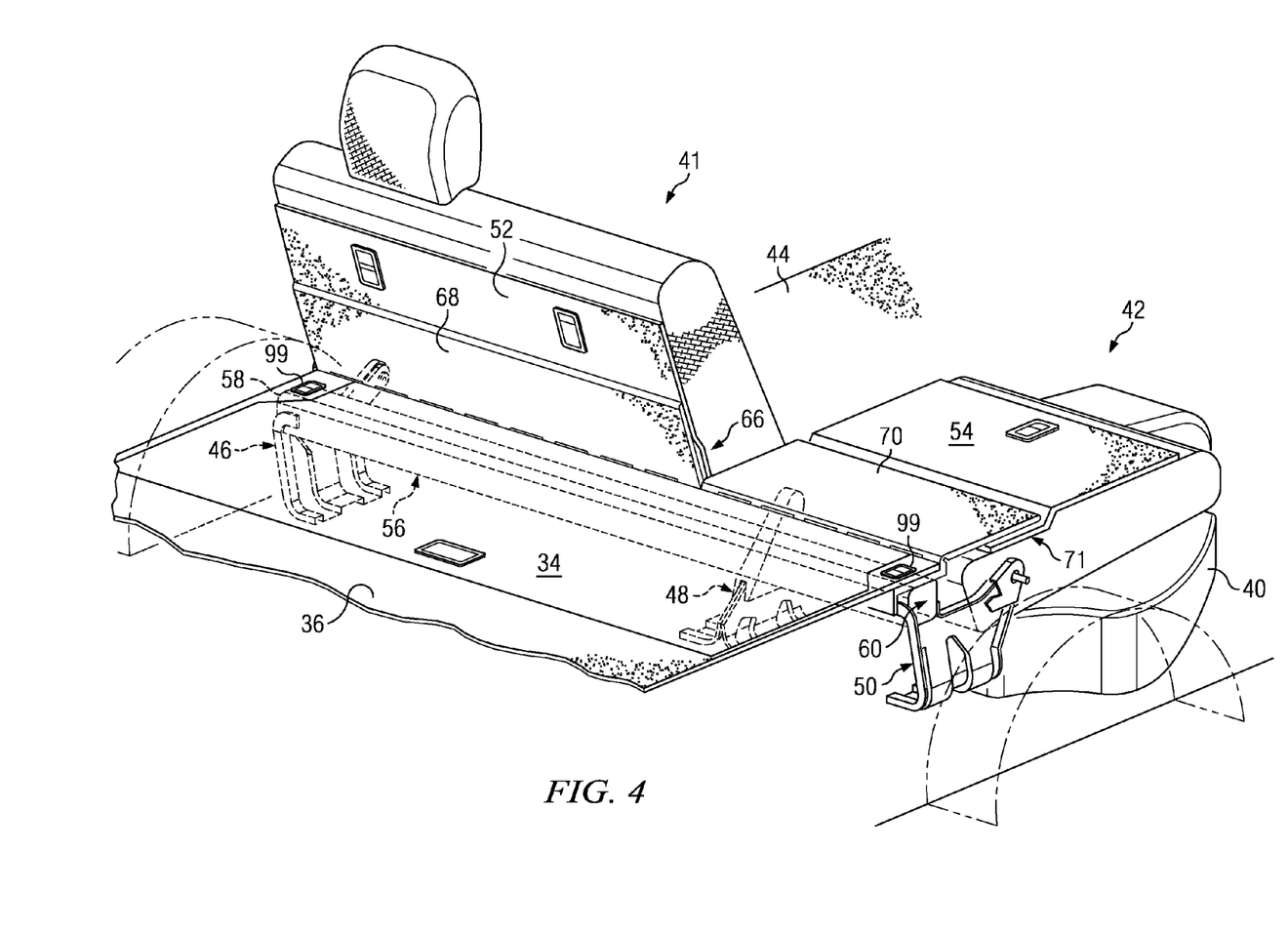
FIG. 4 is a right rear perspective view depicting the components of FIG. 2, but wherein the right seat back is in a cargo support position and the right flap is in a bridging position.
Figure 5:
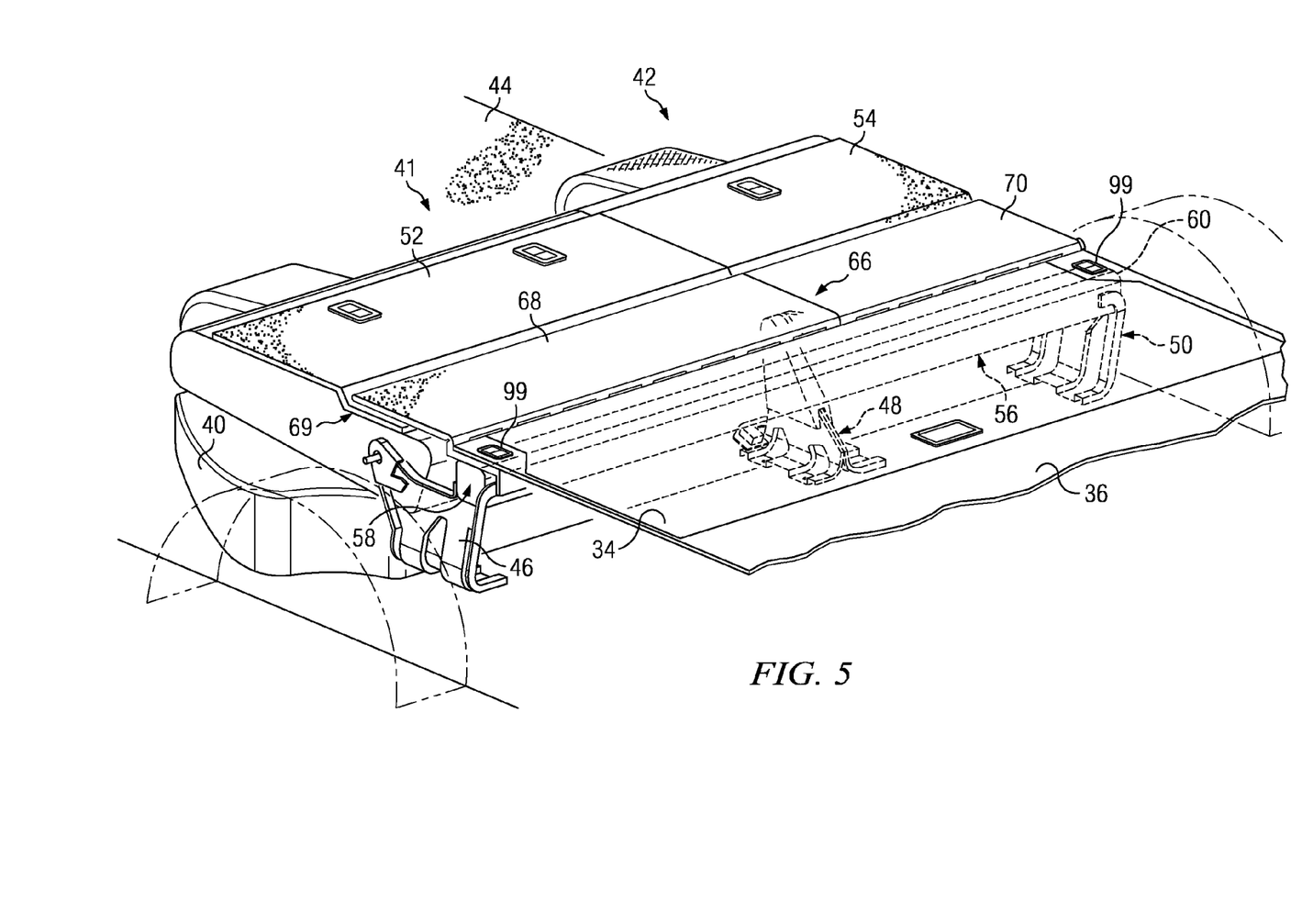
FIG. 5 is a left rear perspective view depicting the components of FIG. 2, but wherein the left and right seat backs are in respective cargo support positions and the left and right flaps are in respective bridging positions.

The left and right seat backs 41, 42 can be selectively moved between an upright position and a cargo support position to achieve a variety of seating/storage configurations. For example, the left and right seat backs 41, 42 can be provided in respective upright positions, as illustrated in FIG. 2, to provide rear seating for passengers in front of the cargo area 30 (e.g., such that the vehicle 20 has a five-passenger configuration). As illustrated in FIG. 3, the left seat back 41 can be collapsed to the cargo support position to expand the cargo area 30 forward to a left front seat (not shown) while the right seat back 42 can remain in the upright position to provide rear seating adjacent to left seat back 41. Conversely, as illustrated in FIG. 4, the right seat back 42 can be collapsed to the cargo support position to expand the cargo area 30 forward to a right front seat (not shown) while the left seat back 41 can remain in the upright position to provide seating adjacent to the right seat back 42. As illustrated in FIG. 5, the left and right seat backs 41, 42 can be collapsed to their cargo support positions to expand the cargo area 30 forward to the left and right front seats (not shown).

As illustrated in FIG. 2, a support member 56 can be attached to the left and right seat support members 46, 50. The support member 56 is shown to extend between a left end 58 and a right end 60. In one embodiment, as illustrated in FIG. 2, the support member 56 is attached to the left seat support member 46 adjacent to the left end 58, and the support member 56 is attached to the right seat support member 50 adjacent to the right end 60. The center seat support member 48 can be attached to the support member 56 at a location between the left end 58 and the right end 60. In one embodiment, the support member 56 can be attached to each of the left, center, and right seat support members 46, 48, 50 with welds, fasteners, adhesive, and/or any of a variety of suitable alternative attachment methods. In an alternative embodiment, a support member can be attached to seat support members through one-piece construction.

The rear seating assembly 32 can include a cover panel 66 that includes left and right flaps 68, 70. The left and right flaps 68, 70 can pivot with respect to the support member 56 between a respective stowed position and a respective bridging position. The left flap 68 can be associated with the left seat back 41 such that movement of the left seat back 41 between the upright and cargo support positions can facilitate movement of the left flap 68 between respective stowed and bridging positions. Similarly, the right flap 70 can be associated with the right seat back 42 such that movement of the right seat back 42 between the upright and cargo support positions can facilitate movement of the right flap 70 between respective stowed and bridging positions.

For example, as illustrated in FIG. 2, when the left and right seat backs 41, 42 are provided in respective upright positions, the left and right flaps 68, 70 can be provided in respective stowed positions and can cooperate with respective left and right rear panels 52, 54 to form a wall in front of the cargo area 30. As illustrated in FIG. 3, when the left seat back 41 is provided in the cargo support position and the right seat back 42 is provided in the upright position, the left flap 68 can be provided in the bridging position and the right flap 70 can be provided in the stowed position. The left rear panel 52 of the left seat back 41 can define a left flap recess 69, as illustrated in FIGS. 2-3. When in the bridging position, the left flap 68 can be arranged within the left flap recess 69 such that the left flap 68 and the left rear panel 52 of the left seat back 41 define a generally planar cargo support surface adjacent to the cargo support surface 38. The right flap 70 can cooperate with the right rear panel 54 of the right seat back 42 to form a wall in front of the right side of the cargo area 30.

Conversely, as illustrated in FIG. 4, when the left seat back 41 is provided in the upright position and the right seat back 42 is provided in the cargo support position, the left flap 68 can be provided in the stowed position and the right flap 70 can be provided in the bridging position. The left flap 68 can cooperate with the left rear panel 52 of the left seat back 41 to form a wall in front of the left side of the cargo area 30. The right rear panel 54 of the right seat back 42 can define a right flap recess 71, as illustrated in FIG. 4. When in the bridging position, the right flap 70 can be arranged within the right flap recess 71 such that the right flap 70 and the right rear panel 54 of the right seat back 42 define a generally planar cargo support surface adjacent to the cargo support surface 38.

As illustrated in FIG. 5, when the left and right seat backs 41, 42 are provided in respective cargo support positions, the left and right flaps 68, 70 can be provided in respective bridging positions. In such a configuration, the left flap 68, the right flap 70, the left rear panel 52, and the right rear panel 54 can cooperate to define a cargo support surface adjacent to the cargo support surface 38.

Figure 6:
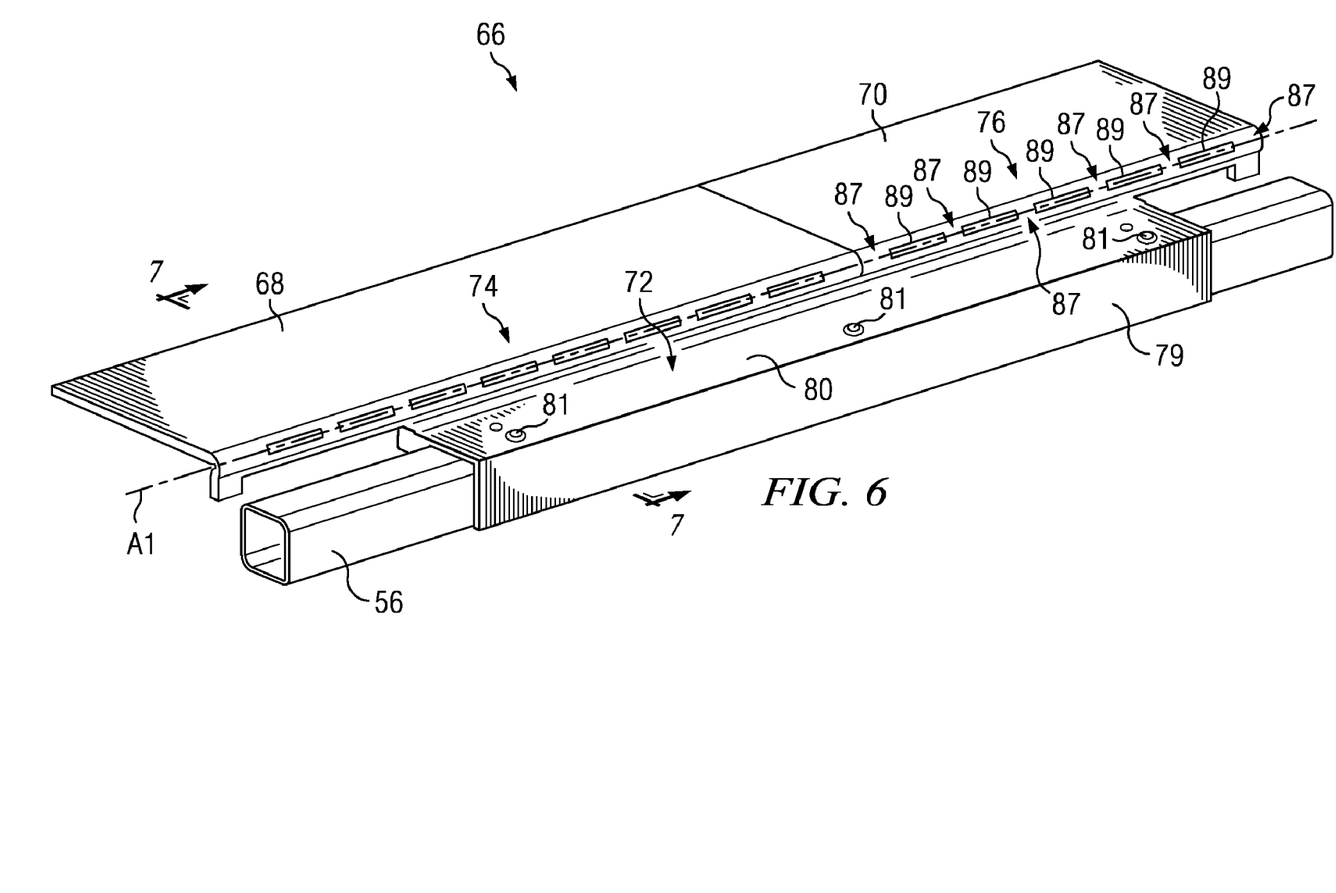
FIG. 6 is a left rear perspective view depicting a cover panel and an associated support member apart from the other components of FIG. 1.
Figure 7:
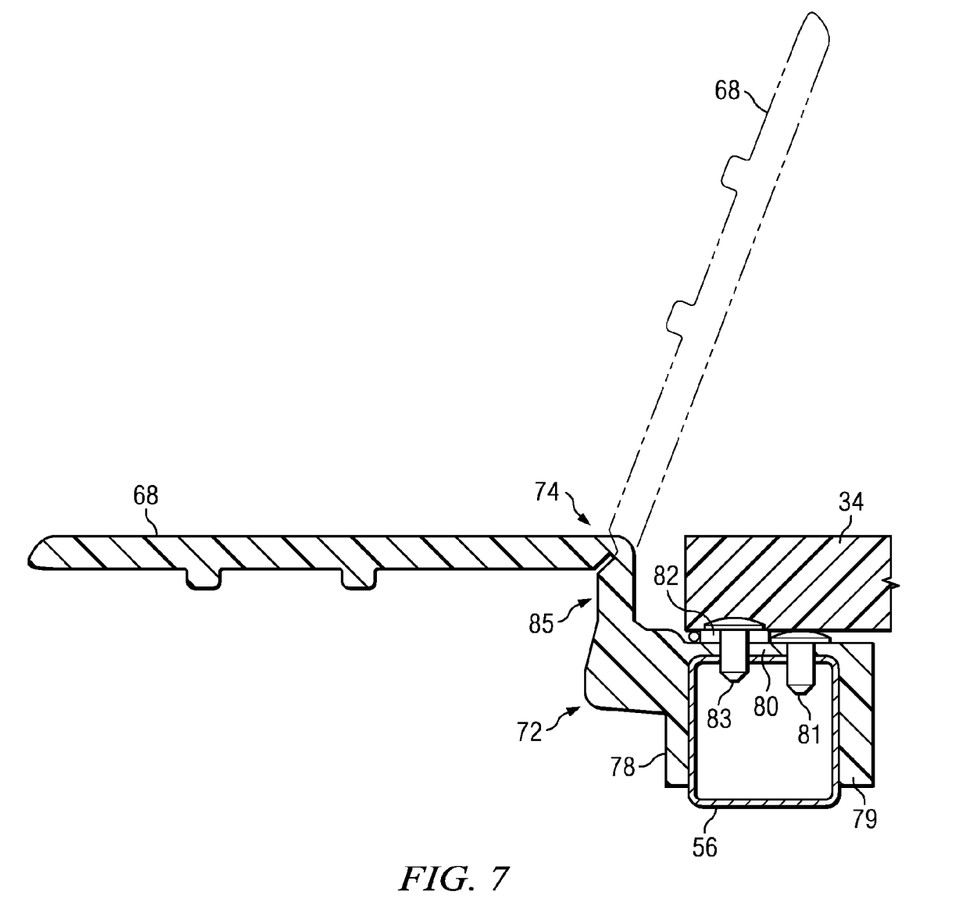
FIG. 7 is a cross-sectional view taken along the section lines 7-7 in FIG. 6, wherein a portion of the front cargo lid and additional features are additionally shown, and wherein the left flap of the cover panel is shown in dashed lines in a stowed position and in solid lines in a bridging position.

The left and right flaps 68, 70 can be pivotally coupled to a base portion 72 with respective left and right perforated living hinges 74, 76, as illustrated in FIG. 6. In one embodiment, as illustrated in FIGS. 6-7, the base portion 72 can include a pair of sidewalls 78, 79 that are coupled together by an upper wall 80. The sidewalls 78, 79 and the upper wall 80 can cooperate together to form an elongate U-channel type structure. The base portion 72 can rest upon the support member 56 such that support member 56 is in a press-fit arrangement with the sidewalls 78, 79 and the upper wall 80 of the base portion 72. A plurality of releasable fasteners 81, shown in FIG. 6, such as a sheet metal screw, for example, can, be provided through the upper wall 80 and the support member 56 to fasten the base portion 72 to the support member 56. It will be appreciated that a base portion can be configured in any of a variety of other suitable arrangements and in one embodiment can comprise separate left and right base portions.

The support member 56 can provide underlying support for the cover panel 66 and can accordingly facilitate improved support of cargo within the cargo area 30. When the left and right flaps 68, 70 of the cover panel 66 are in the bridging position, the left and right rear panels 52, 54 of the left and right seat backs 41, 42 can cooperate with the support member 56 to support the cover panel 66. When cargo is loaded into the cargo area 30 and atop the cover panel 66, the weight of the cargo can be at least partially borne by the support member 56 and/or at least one of the left and right seat backs 41, 42. Additionally, the support member 56 can prevent deformation to the left and right flaps 68, 70 which might otherwise be caused by the weight of cargo, and which could otherwise result in fatigue to the left and right flaps 68, 70 which could shorten their useful life. In addition, when cargo is slid along the load support surface, the support member 56 can resist flexing of the left and right flaps 68, 70, thereby allowing the cargo to slide easily over the left and right flaps 68, 70.

In one embodiment, as illustrated in FIG. 7, the front cargo lid 34 can include a hinge 82 that is coupled with the support member 56 with fasteners (e.g., 83). The hinge 82 can facilitate pivoting of the front cargo lid 34 between a closed position and an opened position to facilitate selective access to an underlying storage compartment. The base portion 72 can define a shoulder 85 that extends adjacent to the front cargo lid 34. Accordingly, when the front cargo lid 34 is in the closed position with the left and right flaps 68, 70 in the bridging position, a portion of the load support surface provided by the front cargo lid 34 can be substantially coplanar with a portion of the load support surface provided by the left and right flaps 68, 70. In another embodiment, a front cargo lid can otherwise be movably attached with respect to a support member, or might not be attached to a support member.

As illustrated in FIGS. 2-5, a pair of cargo attachment members 99 can be provided adjacent to the front cargo lid 34. The cargo attachment members 99 can remain in a fixed location during pivoting of the front cargo lid 34. When cargo is placed upon the cargo support surface 38, the cargo can be releasably attached (e.g., with a retaining strap) to the attachment members 99 to secure the cargo within the cargo area 30. It will be appreciated that cargo attachment members can additionally or alternatively be provided in any of a variety of other suitable locations or configurations.

The rear cargo lid 36 can be pivotable with respect to the body structure 44 between a closed position and an opened position. In one embodiment, the body structure 44 can define a rib member (not shown) that extends between left and right sides of the vehicle 20 beneath the front and rear cargo lids 34, 36. The rib member can underlie the front and rear cargo lids 34, 36 at their interfacing location (e.g., between the front and rear cargo lids 34, 36). The front cargo lid 34 can rest on the rib member when the front cargo lid 34 is in the closed position. The rear cargo lid 36 can be hingedly coupled with the rib member. It will be appreciated that the body structure 44 can define additional support members that provide underlying support for the front cargo lid 34 and/or for the rear cargo lid 36. For example, the body structure 44 can define a shoulder that extends beneath a perimeter of the rear cargo lid 36 to support the rear cargo lid 36 when it is in the closed position. In another embodiment, a rear cargo lid can otherwise be movably attached with respect to a body structure, or might not be attached to a body structure.

It will be appreciated that a vehicle can have any of a variety of suitable alternative cargo lid/cargo area arrangements. For example, a vehicle might include only one cargo lid or might alternatively include three or more cargo lids. In still another embodiment, a cargo support surface can be defined by, or rigidly secured to, the body structure 44. It will be appreciated that a cover panel (e.g., 66), left and right rear panels (e.g., 52, 54) and/or cargo lids (e.g., 34, 36) can be formed from a polymeric material or any of a variety of suitable non-polymeric materials. It will also be appreciated that a cover panel and/or a cargo support surface can include reinforcing structures such as integral rib members.

Figure 8:
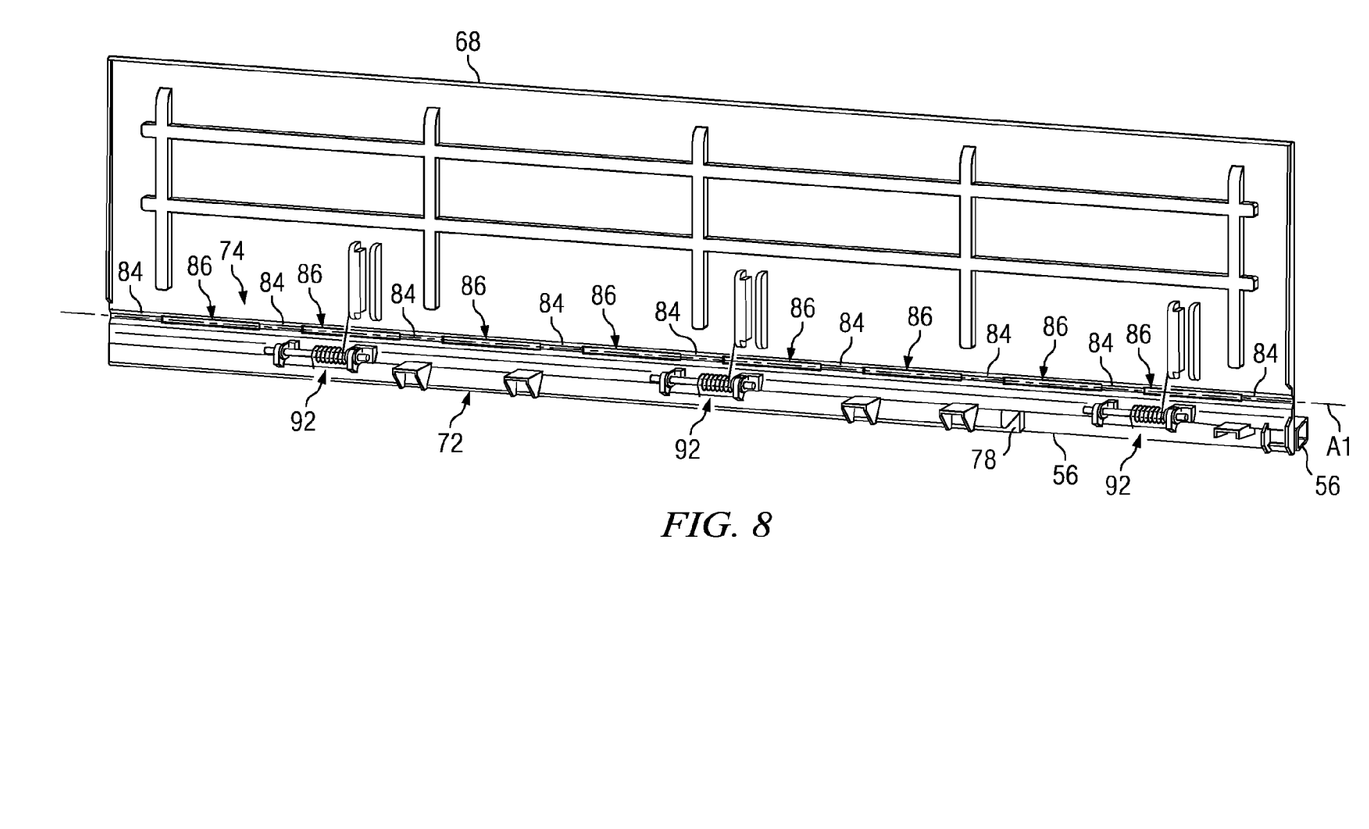
FIG. 8 is a front perspective view depicting the left flap, a left perforated living hinge, and a base portion of the cover panel of FIG. 6, but wherein the left flap is in a stowed position.

As illustrated in FIG. 8, the left perforated living hinge 74 can include a plurality of left arms 84 that each extend between the left flap 68 and the base portion 72. The plurality of left arms 84 can be spaced from each other and thus can cooperate with each other and each of the left flap 68 and the base portion 72 to define a plurality of perforations 86. A hinge axis A1 can intersect the plurality of perforations 86. In one embodiment, as illustrated in FIGS. 6 and 8, the hinge axis A1 can substantially bisect the plurality of perforations 86 such that the plurality of perforations 86 can form a bending line for the left flap 68 relative to the base portion 72. The right perforated living hinge 76 can include a plurality of right arms 87 which contribute to defining a plurality of perforations 89, as illustrated in FIG. 6, and that can be similar in many respects to the left arms 84 and perforations 86 described above with respect to the left perforated living hinge 74.

The left and right arms 84, 87 respectively couple the left and right flaps 68, 70 to the support member 72. When the left and right flaps 68, 70 are pivoted, the respective left and right arms 84, 87 can accordingly bend to facilitate pivoting of the respective left and right flaps 68, 70. The arms 84, 87 might thus be prone to material fatigue from repeated pivoting of the left and right flaps 68, 70. The left and right arms 84, 87, however, can be provided with a sufficient thickness that can resist such fatigue and can accordingly prevent premature failure of the left and right perforated living hinges 74, 76. It will be appreciated that a conventional living hinge is typically provided with an increased thickness to overcome the affects of material fatigue. However, this increased thickness can affect the flexibility of the conventional living hinge and can prevent the living hinge from being pivoted effectively. In addition, reduced flexibility can cause the conventional living hinge to be prone to memory effects. The perforations 86, 89, however, can contribute certain advantages for the left and right perforated living hinges 74, 76. For example, a material thickness for the left and right arms 84, 87 can be utilized that is sufficient to prevent the left and right perforated living hinges 74, 76 from prematurely failing as a result of the fatigue. The perforations 86, 89, however, can reduce the affect that the material thickness might otherwise have on the flexibility of the left and right perforated living hinges 74, 76. The arms 84, 87 can thus be durable enough to prevent failure of the left and right hinges 74, 76, yet still flexible enough to allow for effective pivoting of the left and right flaps 68, 70. The left and right perforated living hinges 74, 76 thus can also be less prone to memory effects than conventional living hinges.

In one embodiment, the left and right perforated living hinges 74, 76 can be formed through injection molding. Typically, injection molding of a living hinge can be difficult to achieve since the material thickness necessary to achieve proper durability is oftentimes too thick to permit proper flexibility. However, reducing the material thickness to increase flexibility can cause the living hinge to be more prone to failure and can be difficult to achieve through injection molding. The perforations 86, 89, however, can allow the left and right arms 84, 87 to be provided at an increased thickness without sacrificing flexibility. The left and right perforated living hinges 74, 76 can be formed with injection molding processes which can provide certain manufacturing advantages (e.g., cost, time) over some conventional multiple-piece cover panel constructions and/or over conventional blow molding process. This can also facilitate forming of the left flap 68, left perforated living hinge 74, right flap 70, and right perforated living hinge 76 as an integral one-piece construction (as illustrated in FIGS. 2-8).

It will be appreciated that arms and perforations of a perforated living hinge can be provided in any of a variety of configurations to achieve a desired hinge strength and flexibility. In one embodiment, as illustrated in FIG. 8, nine left arms 84 can be spaced apart to contribute to defining eight perforations 86. In such an embodiment, the left arms 84 can be about 21.5 mm wide and can have a minimum thickness of about 1 mm and the perforations 86 can be about 53 mm wide.

Figure 9:
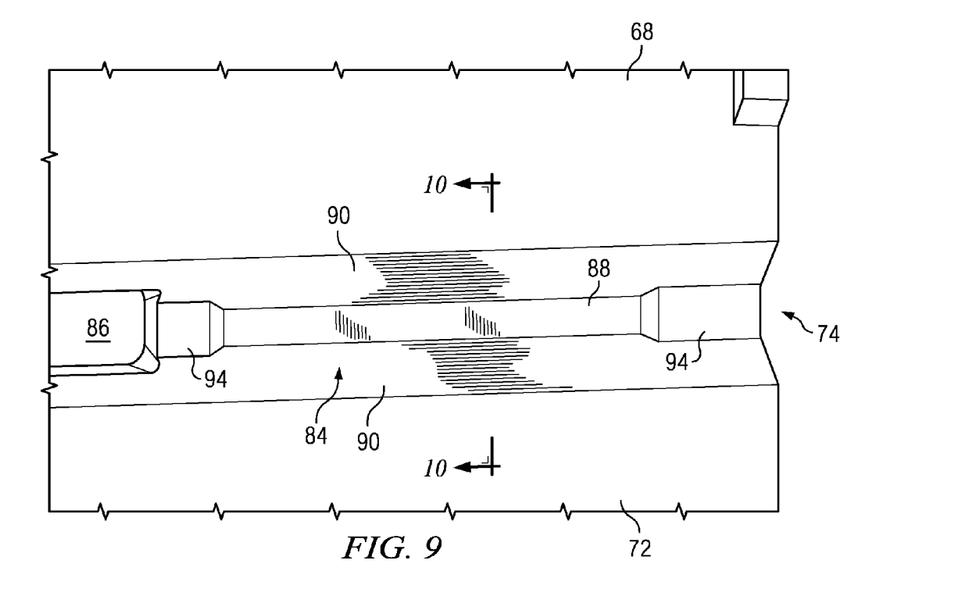
FIG. 9 is an enlarged view depicting a portion of the arrangement of FIG. 8.
Figure 10:
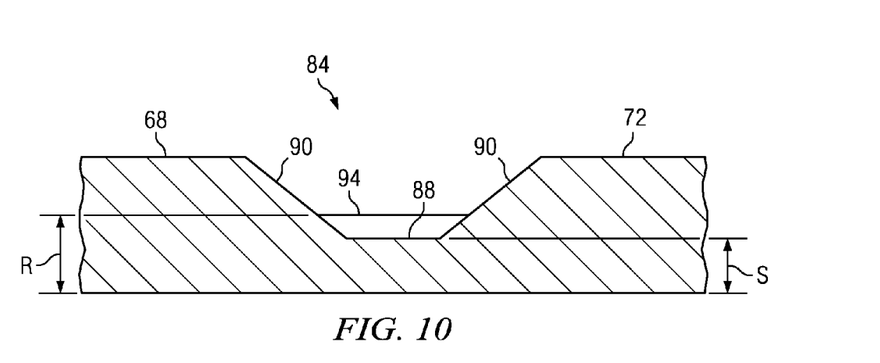
FIG. 10 is a cross-sectional view taken along the section lines 10-10 in FIG. 9.

In one embodiment, as illustrated in FIGS. 9 and 10, one of the left arms 84 of the left perforated living hinge 74 can include a spine portion 88 that is coupled to the left flap 68 and the base portion 72 by way of respective tapered portions 90. The spine portion 88 can include outer rib portions 94 disposed at opposite ends of the spine portion 88. As illustrated in FIG. 10, the spine portion 88 can comprise a spine thickness S and the outer rib portions 94 can comprise a rib thickness R. The rib thickness R can be greater than the spine thickness S. In one embodiment, the rib thicknesses R of each of the outer rib portions 94 can be substantially equal. The outer rib portions 94 can accordingly provide additional strength along the edges of the perforations 86 where the left arms 84 might otherwise be more prone to tearing (e.g., as a result of repeated pivoting of the left perforated living hinge 74). Although the outermost one of the left arms 84 of the left perforated living hinge 74 is shown in FIG. 9, it will be appreciated that one or all other ones of the left arms 84 can include such outer rib portions 94 disposed at opposite ends of the respective spine portions 88. It will also be appreciated that a spine portion of an arm might include an individual rib portion provided at only one end of its spine portion, or at an intermediate location along a spine portion. It will be appreciated that right arms 87 of the right perforated living hinge 76 can be provided in a similar configuration as described above with respect to the left arms 84 of the left perforated living hinge 74.

In one embodiment, cover panel 66 can include a plurality of biasing members 92, such as shown in FIG. 8. Some of the biasing members 92 can be coupled between the left flap 68 and the base portion 72, and others of the biasing members 92 (not shown) can be coupled between the right flap 70 and the base portion 72. The biasing members 92 can bias the left and right flaps 68, 70 to respective bridging positions such that the left and right flaps 68, 70 move together with the respective left and right seat backs 41, 42. For example, when the left and right flaps 68, 70 are each in respective upright positions, the biasing members 92 can hold the left and right flaps 68, 70 in contact with the respective left and right rear panels 52, 54 (e.g., such that they are maintained in the stowed position by the left and right seat backs 41, 42), as generally shown in FIG. 2. When either of the left and right seat backs 41, 42 are moved to the cargo support position, as shown in FIGS. 3-5, the biasing members 92 can hold the left and right flaps 68, 70 against the respective left and right rear panels 52, 54 such that they move together with the respective left and right seat backs 41, 42 and into respective bridging positions. Similarly, when either of the left and right seat backs 41, 42 are moved to the upright position, as shown in FIGS. 3-5, the biasing members 92 can hold the respective left and right flaps 68, 70 against the respective left and right rear panels 52, 54 such that they move together with the respective left and right seat backs 41, 42 and into the stowed position. Although the biasing members 92 are shown in FIG. 8 to comprise springs, it will be appreciated that the biasing members can include any of a variety of suitable alternative devices or configurations.

It will be appreciated that a rear seating assembly can be provided in any of a variety of suitable alternative arrangements. For example, a rear seating assembly might not comprise a bifurcated-type arrangement including two or more separate seat backs (e.g., 41, 42) as described above. For example, an alternative rear seating assembly can include only one cover panel and only one seat back that extend substantially entirely between left and right sides of the vehicle. In another embodiment, a seat back assembly can include three seat backs that are each pivotable between respective upright and cargo support positions.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:
1. A vehicle comprising:
a body structure;
a first seat support member attached to the body structure;
a second seat support member attached to the body structure; and
a rear vehicular seat assembly comprising:

a seat back movably coupled with each of the first seat support member and the second seat support member and movable between an upright position and a cargo support position; and a cover panel associated with the seat back and comprising a flap, a base portion, and a hinge, wherein:

the base portion is fixedly coupled with the body structure;

the hinge comprises a plurality of arms, each arm of the plurality of arms extending between the flap and the base portion to facilitate pivoting of the flap with respect to the base portion about a hinge axis between a stowed position and a bridging position;

each arm of the plurality of arms is formed together with the flap and the base portion in a one-piece construction;

the plurality of arms are spaced from each other and cooperate to at least partially define a plurality of perforations; and at least one of the perforations is intersected by the hinge axis.

2. The vehicle of claim 1 wherein at least one of the plurality of arms comprises a spine portion and a pair of tapered portions, the tapered portions being coupled to opposite ends of the spine portion to facilitate coupling of the spine portion to the base portion and the flap.

3. The vehicle of claim 2 wherein the spine portion comprises a rib portion disposed at one end of the spine portion, the spine portion has a spine thickness, and the rib portion has a rib thickness that is greater than the spine thickness.

4. The vehicle of claim 2 wherein the spine portion comprises a pair of rib portions disposed at opposite ends of the spine portion, the spine portion has a spine thickness, and the rib portions have respective rib thicknesses that are greater than the spine thickness.

5. The vehicle of claim 1 wherein at least one of the perforations is bisected by the hinge axis.

6. The vehicle of claim 1 wherein the seat back defines a rear panel configured to selectively contact the flap when the flap is in the bridging position with the seat back in the cargo support position.

7. The vehicle of claim 6 wherein the rear panel is further configured to selectively contact the flap when the flap is in the stowed position with the seat back in the upright position.

8. The vehicle of claim 1 wherein movement of the seat back to the upright position facilitates movement of the flap to the stowed position.

9. The vehicle of claim 1 further comprising a support member coupled with the first and second seat support members and configured to provide underlying support for the cover panel, wherein, when the flap is in the bridging position with the seat back in the cargo support position, the flap is operable to cover a gap between the support member and the seat back.

* * * * *